United States Patent [19]

Nakayama et al.

[11] Patent Number: 4,824,164
[45] Date of Patent: Apr. 25, 1989

[54] WIRE HARNESS INCORPORATED IN AUTOMOTIVE VEHICLE DOORS

[75] Inventors: Yoshiaki Nakayama; Yasuhiro Miyazawa, both of Shizuoka, Japan

[73] Assignee: Yazaki Corporation, Japan

[21] Appl. No.: 125,584

[22] Filed: Nov. 25, 1987

[51] Int. Cl.⁴ .................... H02G 3/26; B60J 5/00; B60R 16/02
[52] U.S. Cl. .................... 296/146; 174/72 A; 439/34
[58] Field of Search ............... 174/70 C, 72 R, 72 A, 174/72 C; 307/10 R, 10 LS; 361/428; 439/34, 55; 49/502, 503; 296/146

[56] References Cited

U.S. PATENT DOCUMENTS

| | | | |
|---|---|---|---|
| 3,009,010 | 11/1961 | Stearns et al. | 174/72 A |
| 3,836,415 | 9/1974 | Hilderbrandt | 174/72 A X |
| 3,900,241 | 8/1975 | Fry | 174/72 A X |

FOREIGN PATENT DOCUMENTS

| | | | |
|---|---|---|---|
| 3530413 | 2/1987 | Fed. Rep. of Germany | 307/10 R |
| 56-154316 | 11/1981 | Japan | 307/10 R |
| 59-114720 | 8/1984 | Japan | 174/72 A |
| 1177275 | 1/1970 | United Kingdom | 174/72 R |
| 2164609 | 3/1986 | United Kingdom | 296/146 |

*Primary Examiner*—Laramie E. Askin
*Attorney, Agent, or Firm*—Wigman & Cohen

[57] ABSTRACT

To facilitate wire connection work of electric elements disposed in an automotive vehicle door so that the door assembly wiring can be automated, a wire harness is provided which comprises a plurality of parallel-arranged trunk conductors; a plurality of sets of parallel-arranged branch conductors; and in particular a plurality of connector terminals provided at one of each of the branch conductors in such a way as to be each directly connectable to each of the electric elements. The connector terminals are male or female terminals provided so as to project outward and inward from the wire harness surface passing through openings formed in an outer door frame, a trim panel or a decorative panel.

5 Claims, 4 Drawing Sheets

WIRE HARNESS INCORPORATED IN AUTOMOTIVE VEHICLE DOORS

BACKGROUND OF THE INVENTION

1. Field of the Invention

The present invention relates to a wire harness incorporated in an automotive vehicle door and more specifically to a wire harness which can facilitate wire connection work of various electric elements arranged in an automotive vehicle door.

2. Description of the Prior Art

An automotive vehicle door is composed of an outer door frame, an inner trim panel, and a decorative panel, and various electric elements are arranged between these frame and panels. These electric elements are a power window motor, power window switches, a doorlock solenoid, door-side lamp switches, a trunk-lid open switch, etc.

Japanese Published Unexamined (Kokai) Utility Model Application No. 59-114,720 has disclosed a method of connecting various electric elements arranged in an automotive vehicle door, in which a wire harness is fixed onto a waterproof sheet and this sheet is attached to the door frame in order to effectively connect various elements disposed in a narrow and limited door space in a short time.

In this method, the waterproof sheet is first fixed to the door frame by bonding the periphery of the sheet to the frame; conductor ends of the harness are connected to various elements mounted on the door frame and the trim panel; and lastly the trim panel is fixed to the door frame. In other words, the connection work of harness branch conductors is made in the automotive vehicle production line. Further, in the above wire harness, although the trunk portion of the harness is fixed to the waterproof sheet in flat state, since the branch wires are free to move for facilitating of connection of the branch wires to the electric elements and additionally the waterproof sheet is made of soft synthetic resin, there exist various problems in that it takes much time to fix the harness to the waterproof sheet and to connect the harness to the electric elements; and further, the branch conductors are easy to be entangled, so that it is difficult to store or convey the wire harness without deforming the shape of the wire harness.

Further, in the prior method, since branches are formed by connecting the ordinary insulation material coated wire to the trunk portion of the harness, the insulation material must be stripped off from the wire partially to expose the conductor; the exposed conductors must be soldered to the harness trunk or other connectors or joint terminals; and the exposed conductors must be insulated again. Therefore, a number of manufacturing steps have been required and therefore it has been difficult to automate the steps of connecting the electric elements arranged in an automotive vehicle door.

SUMMARY OF THE INVENTION

With these problems in mind, therefore, it is the primary object of the present invention to provide a wire harness incorporated in an automotive vehicle door, the wire harness itself being constructed so that it can be installed in the door by an automated vehicle door assembly system.

To achieve the above-mentioned object, a wire harness for an automotive vehicle door composed of an outer door frame, a trim panel, a decorative panel and electric elements, according to the present invention, comprises: (a) a plurality of parallel-arranged trunk conductors; (b) a plurality of sets of parallel-arranged branch conductors each connected to respective trunk conductors; and (c) a plurality of connector terminals provided at one end of each of said branch conductors in such a way as to be each directly connectable to each of the electric elements.

When the wire harness is disposed between the outer door frame and the trim panel, the connector terminals project outward from a flat surface of the wire harness through openings formed in the door frame and inward from said flat surface through openings formed in the trim panel.

When the wire harness is disposed between the trim panel and the decorative panel, the connector terminals project outward from a flat surface of the wire harness through openings formed in the trim panel and inward from said flat surface through openings formed in the decorative panel.

The connector terminals are male terminals connectable of female terminals connected to the electric elements, or female terminals connectable to male terminals connected to the electric elements. The electric elements are a power window motor, a door-lock solenoid, a door-side lamp switch, a trunk lid open switch, and power window switches, etc.

In the wire harness incorporated in an automotive vehicle according to the present invention, when a waterproof sheet on which the wire harness is bonded is attached to the trim panel and then the trim panel is fitted to the outer door frame, since the connector terminals provided at branch conductor ends project outward through the openings of the door frame (or the trim panel) or inward through the openings of the trim panel (or the decorative panel), various electric elements housed in the door frame or on the trim panel or the decorative panel are readily connectable to each other via the connector terminals provided for the wire harness.

BRIEF DESCRIPTION OF THE DRAWINGS

The features and advantages of the wire harness incorporated in an automotive vehicle door according to the present invention will be more clearly appreciated from the following description of the preferred embodiments of the invention taken in conjunction with the accompanying drawings in which like reference numerals designate the same or similar elements or sections throughout the figures thereof and in which.

DETAILED DESCRIPTION OF THE PREFERRED EMBODIMENTS

An embodiment of the wire harness incorporated in an automotive vehicle door according to the present invention will be described hereinbelow with reference to the attached drawings.

Figure 1:
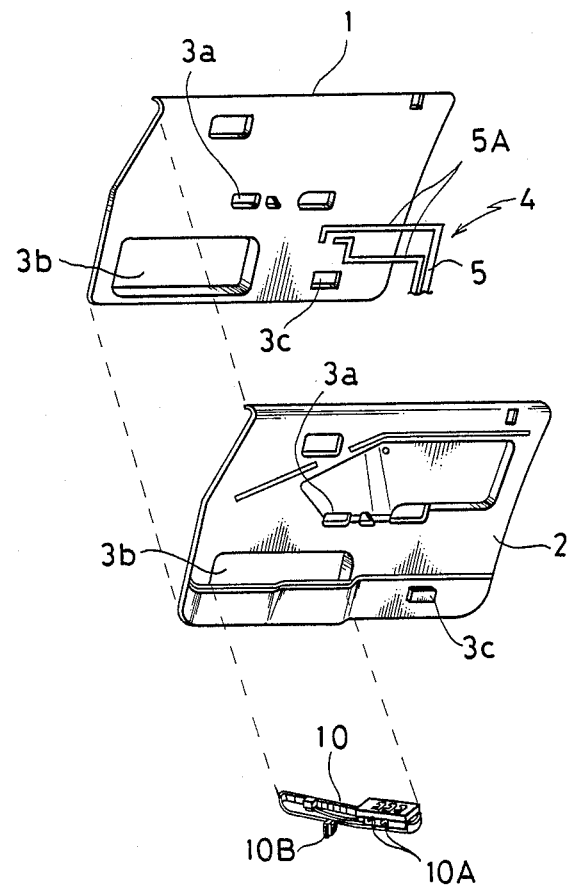
FIG. 1 is an exploded view of a trim panel, a wire harness a decorative panel, and a combination switch.

FIG. 1 is an exploded view of a part of an automotive vehicle door. In the drawing, the numeral 1 denotes a trim panel attached to an inner side of an outer door frame (not shown); the numeral 2 denotes a decorative panel attached to the inner side of the trim panel 1, and the numeral 10 denotes a combination switch.

The trim panel 1 and the decorative panel 2 are both formed with various openings 3a, 3b and 3c to or through which various electric elements (e.g. a power window motor, a door lock solenoid, a door-side lamp, a trunk-lid open switch, power window switches, etc.) are fitted or mounted.

The combination switch 10 is a switch unit including plural switches and connected to other elements via male terminal 10A or female terminal 10B.

A wire harness 4 for a vehicle door of the present invention is composed of a plurality of flat trunk conductors 5 and a plurality of flat branch conductors 5A. The wire harness 4 is sandwiched between the trim panel 1 and the decorative panel 2. These flat conductors 5 and 5A are formed by punching a copper plate in such a way that ends of the flat branch conductors 5A reach the vicinity of various electric elements, respectively.

Figure 2A:
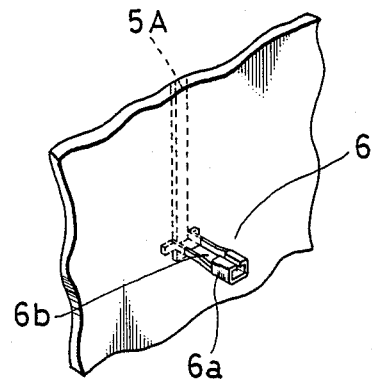
FIG. 2A is a perspective view showing a female terminal connector provided at an end of a branch conductor.
Figure 2B:
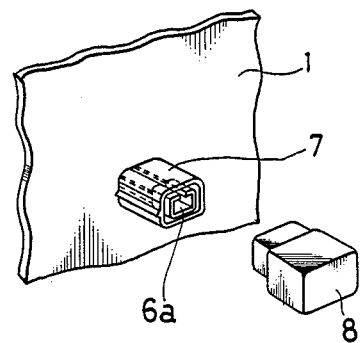
FIG. 2B is a similar perspective view showing the female terminal connector (shown in FIG. 2A) covered by a connector housing.

FIGS. 2A and 2B show an example of a female connector 6 attached to an end of a branch conductor 5A. This connector 6 is directly connectable to an electric element or another connector connected to an electric element. The female connector 6 shown in FIG. 2A includes a pair of connector terminals 6b both fixed at a right angle to a cross end of the branch conductor 5A by soldering, welding, rivets, grommets, etc., and a square member 6a to which a mate male connector terminal is fitted.

Further, as shown in FIG. 2B, it is also preferable to cover the female conductor 6 by a connector housing 7 so as to be engageable with another male connector housing 8 of a connector connected to an electric element.

Further, in FIG. 2A, when a male connector terminal is required to form, an extreme end of the branch conductor 5A is bent at a right angle with respect to the surface of the wire harness.

Figure 3:
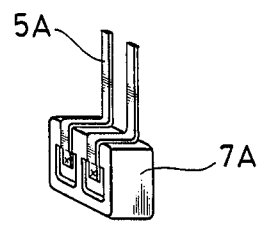
FIG. 3 is a similar perspective view showing another terminal connector provided at an end of a branch conductor.

FIG. 3 shows another example of a female connector attached to an end of a branch conductor 5A. In this example, an extreme end of the branch conductor 5A is bent into an L-shape and fixed to a connector housing 7A by the afore-mentioned connecting means (soldering, welding, rivets, grommets). In this connector shown in FIG. 3, the surface of the connector housing 7A is flush with the wire harness, without projecting therefrom as in FIG. 2B.

The procedure of assembly of the wire harness according to the present invention will be described hereinbelow. Some electric elements (e.g. power window motor) are fixed at predetermined positions of an outer door frame (not shown). On the other hand, a door wire harness 4 is fixed to the trim panel 1, and the trim panel 1 provided with the wire harness 4 is fitted to the door frame. In this step, some male or female connectors (as shown in FIGS. 2A, 2B and 3) connected to the branch terminal ends or the trunk terminal end are directly connected to the electric elements disposed within the door frame through the openings formed in the trim panel on the outer side of the trim panel 1. Further, the decorative panel 2 is fixed to the trim panel 1. Thereafter, the combination switch 10 as shown in FIG. 1 (power window switches, etc.) is fitted to the opening formed in the decorative panel 2 by simultaneously engaging the male and female terminals 10A and 10B (shown in FIG. 1) of the combination switch 10 with predetermined female and male terminals also provided at ends of the trunk or branch conductors of the wire harness.

Figure 4:
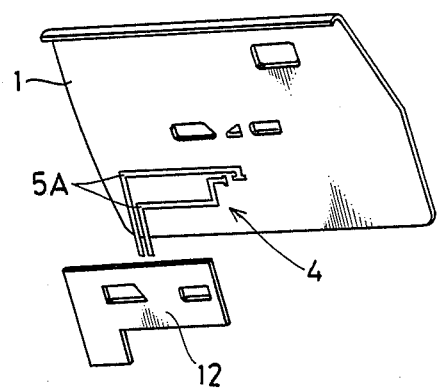
FIG. 4 is a perspective view showing the wire harness disposed between a trim panel and an insulation sheet.

FIG. 4 shows another embodiment, in which the wire harness 4 incorporated in a vehicle door is disposed on the outer surface of the trim panel 1, that is, between the door frame and the trim panel 1. In this embodiment, an insulating sheet 12 is preferably disposed on the wire harness 4 to insulate it from the door frame more reliably.

Figure 5:
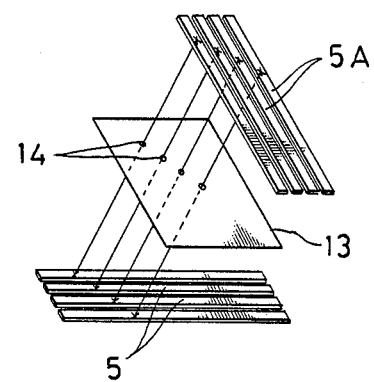
FIG. 5 is a perspective view for showing a method of connecting a plurality of trunk conductors and a plurality of branch conductors.

FIG. 5 shows a method of connecting branch conductors 5A to trunk conductors 5 or vice versa. In this case, a plurality of parallel arranged branch conductors 5A are fixed to a plurality of parallel arranged trunk conductors 5 via holes 14 formed in an insulation sheet 13, respectively. The method of fixing the two conductors is soldering, welding, rivets, grommets, etc, as already explained.

Figure 6:
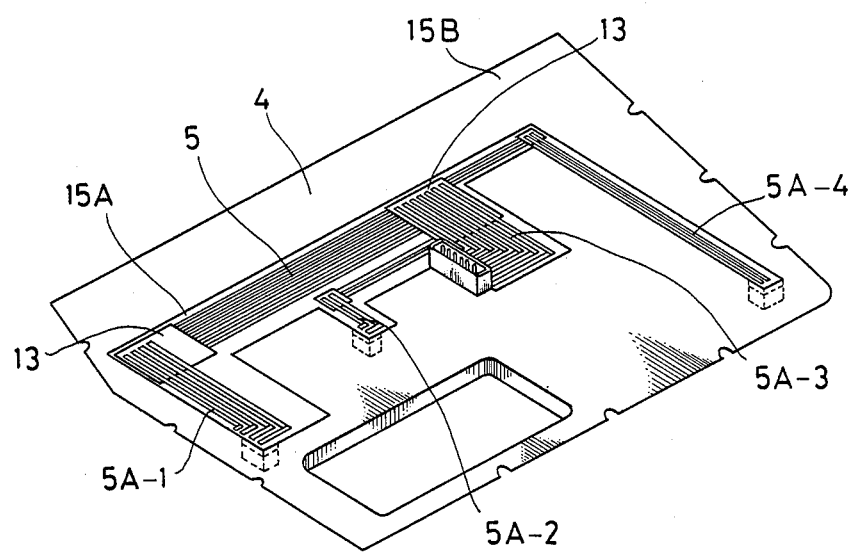
FIG. 6 is a perspective view showing an example of wire harness for an automotive vehicle door according to the present invention.

FIG. 6 shows a practical example of a wire harness incorporated in an automotive vehicle door. The wire harness 4 is composed of a plurality of parallel arranged trunk conductors 5, a plurality of parallel arranged branch conductors 5A-1, 5A-2, 5A-3, and 5A-4, and a plurality of connector terminals provided at one end of each of the branch conductors. Further, the above wire harness 4 is bonded on an insulation sheet 15A and further covered by a waterproof sheet 15B as shown. Further, although not shown, it is also possible to provide some connector terminals or connectors at each end of the trunk conductor.

As described above, in the wire harness incorporated in an automotive vehicle door according to the present invention, since the wire harness is composed of flat conductors and provided with connector terminals or connectors directly connectable to various electric elements disposed within a vehicle door at the branch conductor ends on both sides of the wire harness, when a trim panel on which the wire harness is fixed is fitted to a door frame and then a decorative panel is fitted to the trim panel, various electric elements can be simply connected to each other via the connectors or the connector terminals attached to the wire harness of the present invention.

What is claimed is:

1. A wire harness incorporated in an automotive vehicle door including electric elements, said harness being disposed between an outer door frame having openings formed therein and a trim panel having openings formed therein, which comprises:
    a plurality of parallel-arranged trunk conductors;
    a plurality of sets of parallel-arranged branch conductors, an end of one of each of said branch conductors being connected to an end of one of said trunk conductors in one to one correspondence in predetermined order; and a plurality of connector terminals provided at predetermined ends of said branch conductors so as to project at right angles in an outward direction from a flat surface of said wire harness through the openings formed in the door frame and in an inward direction from said flat surface through the openings formed in the trim panel.

2. The combination as set forth in claim 1, wherein said connector terminals are male terminals connectable to female terminals connected to the electric elements.

3. The combination as set forth in claim 1, wherein said connector terminals are female terminals connectable to male terminals connected to the electric elements.

4. The combination as set forth in claim 1, wherein at least one connector terminal is further provided at at least one end of a trunk conductor in such a way as to be directly connectable to an electric element.

5. A wire harness incorporated in an automotive vehicle door including electric elements, said harness being disposed between a trim panel having openings formed therein and a decorative panel having openings formed therein, which comprises:

a plurality of parallel-arranged trunk conductors;

a plurality of sets of parallel-arranged branch conductors, an end of one of each of said branch conductors being connected to an end of one of said trunk conductors in one to one correspondence in predetermined order; and a plurality of connector terminals provided at predetermined ends of said branch conductors so as to project at right angles in an outward direction from a flat surface of said wire harness through the openings formed in the trim panel and in an inward direction from said flat surface through the openings formed in the decorative panel.

* * * * *